United States Patent
Guo et al.

(10) Patent No.: US 9,692,658 B2
(45) Date of Patent: Jun. 27, 2017

(54) WIRELESS NETWORK MONITORING DEVICE, METHOD AND DEVICE IN WIRELESS COMMUNICATION SYSTEM

(71) Applicant: Sony Corporation, Minato-ku (JP)

(72) Inventors: Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/326,569

(22) Filed: Jul. 9, 2014

(65) Prior Publication Data
US 2015/0092597 A1 Apr. 2, 2015

(30) Foreign Application Priority Data
Sep. 29, 2013 (CN) .......................... 2013 1 0456196

(51) Int. Cl.
| | |
|---|---|
| *H04W 24/00* | (2009.01) |
| *H04L 12/24* | (2006.01) |
| *H04W 24/10* | (2009.01) |
| *H04W 16/18* | (2009.01) |
| *H04W 24/02* | (2009.01) |
| *H04L 12/26* | (2006.01) |

(52) U.S. Cl.
CPC ............ *H04L 41/12* (2013.01); *H04W 16/18* (2013.01); *H04W 24/02* (2013.01); *H04W 24/10* (2013.01); *H04L 41/145* (2013.01); *H04L 41/22* (2013.01); *H04L 43/0817* (2013.01)

(58) Field of Classification Search
CPC ....... H04L 41/12; H04L 41/22; H04L 41/145; H04L 43/0817; H04W 24/10; H04W 24/02; H04W 16/18
See application file for complete search history.

(56) References Cited

U.S. PATENT DOCUMENTS

| | | | | |
|---|---|---|---|---|
| 7,692,573 | B1* | 4/2010 | Funk ...................... | G01S 7/003 342/90 |
| 7,796,619 | B1* | 9/2010 | Feldmann ............... | H04L 41/22 370/229 |
| 2006/0036729 | A1* | 2/2006 | Sakaguchi .............. | H04L 43/02 709/224 |
| 2007/0091858 | A1* | 4/2007 | Wu ....................... | H04L 63/107 370/338 |
| 2008/0049657 | A1* | 2/2008 | Feng ....................... | H04B 7/26 370/315 |

* cited by examiner

*Primary Examiner* — Omar Ghowrwal
(74) *Attorney, Agent, or Firm* — Oblon, McClelland, Maier & Neustadt, L.L.P.

(57) ABSTRACT

There is provided a wireless network monitoring device, method and device in a wireless communication system, the wireless network monitoring device including: a network distribution space information acquiring unit configured to acquire network distribution space information of a three dimensional distribution space of a network to be monitored; a network status information acquiring unit configured to acquire position information of network nodes in the three dimensional distribution space and performance information of the network nodes, thereby obtaining network status information about the three dimensional distribution space; and a display unit configured to display the network distribution space information and the network status information which are superimposed. According to embodiments of the disclosure, it enables a user to obtain better network service experience.

20 Claims, 15 Drawing Sheets

WIRELESS NETWORK MONITORING DEVICE, METHOD AND DEVICE IN WIRELESS COMMUNICATION SYSTEM

FIELD OF THE INVENTION

The present invention relates to the field of wireless communication, and in particular to a wireless network monitoring device and method in a wireless communication system and a device which operates according to the control of the wireless network monitoring device and method.

BACKGROUND OF THE INVENTION

With constant change in the semiconductor technology, microelectronics technology and computer technology, mobile communication has been fully developed and applied. While wireless traffic increases explosively, function of user equipment is further enhanced, so that personal networking becomes possible, which provides new experience of wireless network service to a user. However, due to continuous sharp increase in an amount of the user equipment and varieties of the services, complexity of a network structure is increased. How to provide convenient equipment networking and network equipment status monitoring has become a basis for the user to further implement data management, equipment management, safety management and energy saving management.

Presently, a fixed networking manner is widely used in a public indoor and outdoor space, the infrastructure (including base stations and network access points) is disposed by a professional person through an on-site survey, which is time-wasted and effort-wasted and lacks flexibility, and thus can not be adapted to the variable environment such as a home network. Further, most of the existing Ad hoc networks lack a corresponding network and equipment status monitoring device; however, with the rapid increase in the amount of the user equipment, the complexity of the network is higher and higher, and thus the management requirement for the network is more and more urgent.

SUMMARY OF THE INVENTION

Brief summary of the disclosure is given hereinafter, so as to provide basic understanding about some aspects of the disclosure. However, it should be understood that this summary is not exhaustive description of the disclosure. It is neither intended to be used to determine a critical part or important part of the disclosure, nor to define the scope of the disclosure. Its purpose is only to give some concepts of the disclosure in a simplified manner, to serve as a preamble of the more detailed description which will be given later.

Thus, in view of the above, it is an object of the disclosure to provide a wireless network monitoring device and method in a wireless communication system, which are capable of at least vividly displaying status information of a network layout environment, a network access point and network user equipment by means of a visualized operation and touch interface, so as to help the user implement network interconnection, for providing the user with at least one service of convenient and optimized data management, equipment management, safety management and energy saving management.

According to an aspect of the disclosure, there is provided a wireless network monitoring device in a wireless communication system, which includes: a network distribution space information acquiring unit configured to acquire network distribution space information of a three dimensional distribution space of a network to be monitored; a network status information acquiring unit configured to acquire position information of network nodes in the three dimensional distribution space and performance information of the network nodes, thereby obtaining network status information about the three dimensional distribution space; and a display unit configured to display the network distribution space information and the network status information which are superimposed.

According to a preferred embodiment of the disclosure, the network nodes may include network access points.

According to another preferred embodiment of the disclosure, the network nodes may further include network user equipment, and the network status information acquiring unit may be further configured to acquire transmission status information of the network nodes so as to obtain the network status information.

According to another preferred embodiment of the disclosure, the wireless network monitoring device may further include: a network programming calculating unit configured to calculate, according to at least the network distribution space information and the network status information, optimized network programming within the three dimensional distribution space to improve a percentage of coverage of wireless network in the three dimensional distribution space or signal transmission quality of the network nodes, wherein the display unit may be further configured to display the optimized network programming.

According to another preferred embodiment of the disclosure, the network programming calculating unit may be further configured to calculate the optimized network programming according to network status requirement information about the three dimensional distribution space.

According to another preferred embodiment of the disclosure, the optimized network programming calculated by the network programming calculating unit may include target working status, target positions and/or target transmission status of respective network nodes.

According to another preferred embodiment of the disclosure, the network status requirement information may include a movement range in the three dimensional distribution space, a movement manner, types of the user equipment desired to be used, desired interconnections among the network nodes, types and number of the network access points desired to be used and/or cost.

According to another preferred embodiment of the disclosure, the wireless network monitoring device may further include: a network node status information providing unit configured to make, in response to an operation of selecting a network node by a user, the display unit display network node status information about the selected network node, the network node status information including position information, performance information, transmission status information of the selected network node and/or optimized network programming information about the network node.

According to another preferred embodiment of the disclosure, the wireless network monitoring device may further include: a network node status controlling unit configured to control position, working status and/or transmission status of the network node according to the optimized network programming information.

According to another preferred embodiment of the disclosure, the wireless network monitoring device may further include: a network flow monitoring unit configured to judge, when service changes within the three dimensional distribution space, whether network flow in the three dimensional distribution space is able to satisfy service requirement according to the network distribution space information and the network status information, wherein the network programming calculating unit recalculates the optimized network programming according to a judging result of the network flow monitoring unit.

According to another preferred embodiment of the disclosure, if the network user equipment is able to get access via a plurality of network access points, the optimized network programming may include service reformation including content-based link combination and/or splitting, and wherein the network programming calculating unit further includes a service reformation managing module for performing the service reformation.

According to another preferred embodiment of the disclosure, the wireless network monitoring device may further include: a network distribution space monitoring unit configured to collect network distribution space information about the three dimensional distribution space of the network to be monitored so as to supply it to the network distribution space information acquiring unit, wherein the network distribution space monitoring unit includes a camera, a locating detecting device, an image scanning device and/or an information input device.

According to another preferred embodiment of the disclosure, the wireless network monitoring device may further include: a user interface unit for receiving an input from the user, wherein the network status requirement information is input by the user via the user interface unit or is acquired automatically by the wireless network monitoring device by means of the network user equipment.

According to another aspect of the disclosure, there is further provided a method for use in a wireless communication system, which includes: a network distribution space information acquiring step for acquiring network distribution space information of a three dimensional distribution space of a network to be monitored; a network status information acquiring step for acquiring position information of network nodes in the three dimensional distribution space and performance information of the network nodes, thereby obtaining network status information about the three dimensional distribution space; and a display step for displaying the network distribution space information and the network status information which are superimposed.

According to yet another aspect of the disclosure, there is further provided a device in a wireless communication system, which includes: a receiving unit configured to receive status control for the device from the wireless network monitoring device according to the disclosure; and an executing unit configured to change a position, working status and/or transmission status of the device according to the status control received by the receiving unit.

According to yet another aspect of the disclosure, there is further provided a storage medium including machine-readable program codes which when executed on a information processing apparatus cause the information processing apparatus to perform: a network distribution space information acquiring step for acquiring network distribution space information of a three dimensional distribution space of a network to be monitored; a network status information acquiring step for acquiring position information of network nodes in the three dimensional distribution space and performance information of the network nodes, thereby obtaining network status information about the three dimensional distribution space; and a display step for displaying the network distribution space information and the network status information which are superimposed.

According to still yet another aspect of the disclosure, there is further provided a program product including machine-executable instructions which when executed on a information processing apparatus cause the information processing apparatus to perform: a network distribution space information acquiring step for acquiring network distribution space information of a three dimensional distribution space of a network to be monitored; a network status information acquiring step for acquiring position information of network nodes in the three dimensional distribution space and performance information of the network nodes, thereby obtaining network status information about the three dimensional distribution space; and a display step for displaying the network distribution space information and the network status information which are superimposed.

Other aspects of the embodiments of the disclosure are given in the following description, in which the detailed description is used to fully disclose the preferred embodiments of the disclosure without any limitation.

BRIEF DESCRIPTION OF THE DRAWINGS

The disclosure can be better understood by referring to the detailed description given below with reference to the accompanying drawings throughout which identical or similar components are denoted by identical or similar reference numbers. The drawings together with the following detailed explanation are included in this specification and form part of the specification so as to further illustrate preferred embodiments of the invention by way of example and explain principles and advantages of the invention. In the drawing.

DETAILED DESCRIPTION OF THE INVENTION

Figure 1:
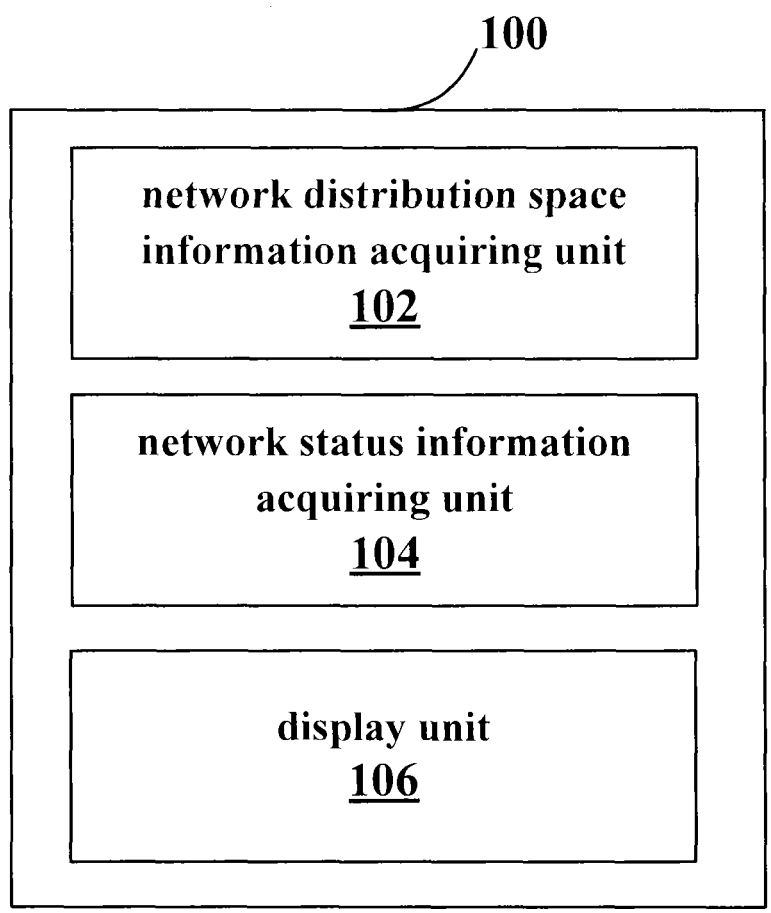
FIG. 1 is a block diagram showing an example of functional configuration of a wireless network monitoring device according to an embodiment of the disclosure.

Exemplary embodiments of the present invention will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-relevant constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the invention are illustrated in the drawings while other details less relevant to the invention are omitted so as not to obscure the invention due to those unnecessary details.

A wireless network monitoring device, method and device in a wireless communication system according to embodiments of the disclosure will be described by referring to FIG. 1 to FIG. 15 in the following.

Firstly, an example of functional configuration of a wireless network monitoring device according to an embodiment of the disclosure will be described by referring to FIG. 1 in the following. FIG. 1 is a block diagram showing an example of functional configuration of a wireless network monitoring device according to an embodiment of the disclosure.

As shown in FIG. 1, a wireless network monitoring device 100 may include a network distribution space information acquiring unit 102, a network status information acquiring unit 104 and a display unit 106.

The network distribution space information acquiring unit 102 may be configured to acquire network distribution space information of a three dimensional distribution space of a network to be monitored.

Preferably, the network to be monitored can be set by a user, and may be correlated with the wireless network monitoring device 100. Once the setting and correlation are completed, the wireless network monitoring device 100 can acquire in real time the network distribution space information of the three dimensional distribution space of the network to be monitored, and can store the acquired network distribution space information into a database for example.

It should be understood that the three dimensional distribution space of the network to be monitored can be a space in which the user locates, and can also be a space in which the user does not locate so that the network to be monitored can be remotely monitored via a network such as Internet. Then, the network distribution space information acquiring unit 102 can update the network distribution space information periodically or as required.

It should be understood that the acquired network distribution space information can be presented in a form of a real three dimensional space construction or a virtual synthesized three dimensional space construction depending on different acquiring manners of the network distribution space information.

The network status information acquiring unit 104 may be configured to acquire position information of network nodes in the three dimensional distribution space and performance information of the network nodes, thereby obtaining network status information about the three dimensional distribution space. The network status information may include for example space distribution information and performance information of the network nodes. The space distribution information refers to specific positions of the network nodes in the three dimensional distribution space of the network to be monitored described above, and may be denoted as three dimensional coordinates with respect to a origin of the three dimensional distribution space for example. The performance information refers to effective working distance, transmission power, working frequency band, supported communication protocol and the like of the network nodes for example, and can be input by the user manually for example. The performance information of the network nodes (for example, coverage of a network access point, communicable distance of network user equipment and the like) can be indicated by circles of different sizes when being displayed later for example. It can be understood that the network status information can be used to ensure the desired network coverage when performing network programming later.

Further, it should be understood that the position information of the network node can indicate the actual physical position of the network node, and can also be a virtual physical position calculated according to the current status of the network to be monitored. It should be understood that the virtual physical position here is not the position of the network node that is detected actually, but the position at which the network node is to be located and which is obtained by calculation, for example, the position at which the user may be instructed to dispose the network access point when the user performs network layout initially or the like.

Figure 2A:
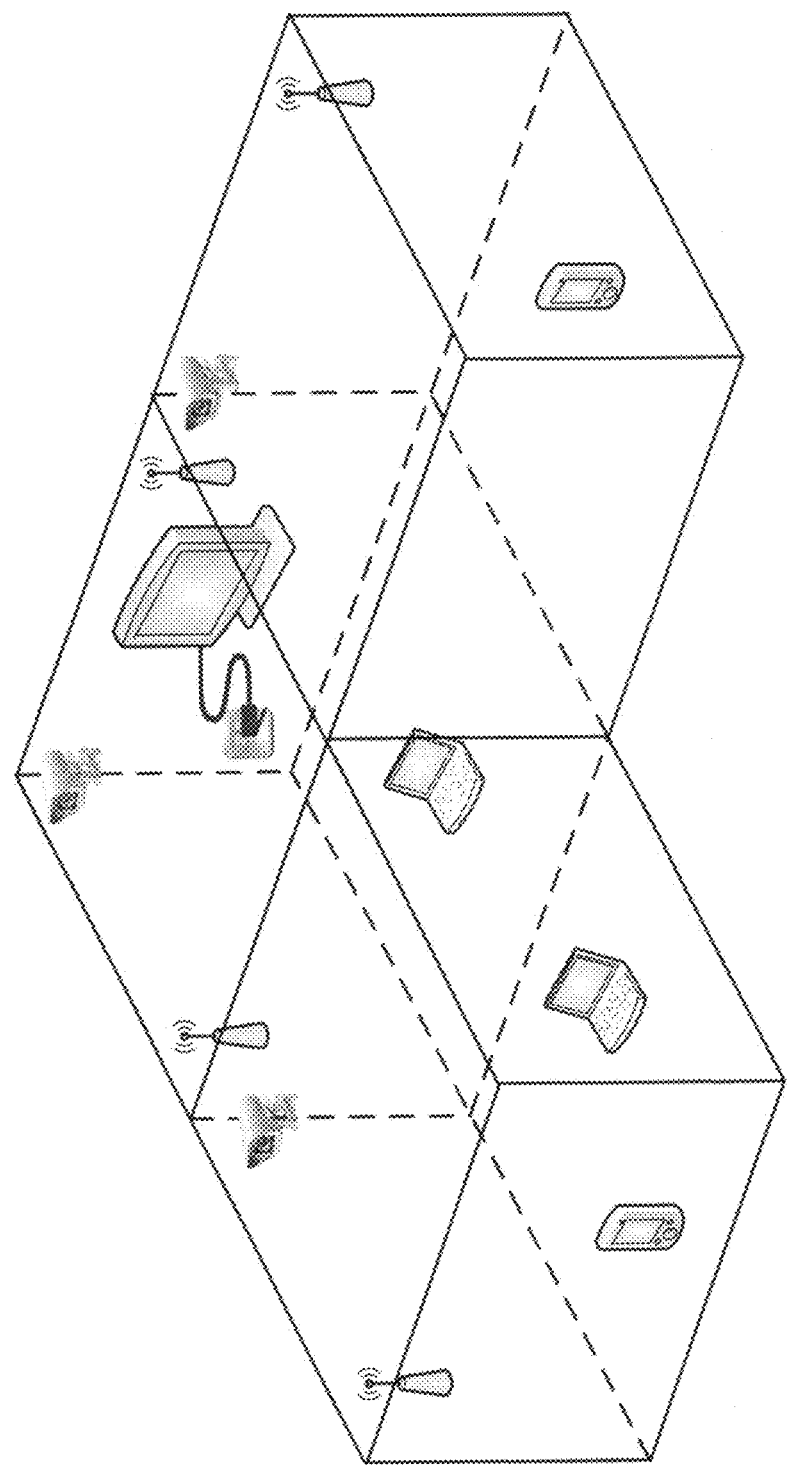
FIG. 2A is a schematic diagram showing a network distribution space and a network node distribution.

For example, FIG. 2A shows a schematic diagram of a network distribution space and a network node distribution, which is a schematic synthesized diagram of an indoor environment for example.

Preferably, the network node may include a network access point and network user equipment.

The network access point can provide the network user equipment with the network access service, and include for example various types of base stations (BS) and access points (AP). The network access points can be connected to the wireless network monitoring device 100 in a wired or wireless manner directly, or can be connected mutually via a wired or wireless backbone network. Then, once the wireless network monitoring device 100 accesses the backbone network, the wireless network monitoring device 100 can perform information interaction with the network access points. The backbone network can be constructed by a wireless link, or can be a wired optical cable, coaxial cable, power line or the like.

The network user equipment gets access via the network access points to obtain various network services. The network user equipment can perform information interaction with the wireless network monitoring device 100 in a wired or wireless manner directly, or can achieve the information interaction with the wireless network monitoring device 100 via a relay of the network access point. The network user equipment can be for example a notebook computer, a desktop computer, a tablet computer, a personal digital assistant (PDA), a television set, a mobile phone or other intelligent appliance that can be networked.

Further, preferably, the network status information acquiring unit 104 may be configured to acquire transmission status information of the network nodes so as to obtain the network status information. The transmission status information refers to the status information of the network nodes related to the signal transmission, including for example at least one of working status (i.e., operating/idle), associated effective link (associated backbone network link between the network access points, and access link between the network access point and the network user equipment), flow information, energy consumption information and various related control operation information. It should be understood that the network nodes can be associated with the network distribution space by the user initially, then the network status information acquiring unit 104 can acquire corresponding information (e.g. the position information, performance information and transmission status information of the network nodes and the like) by performing information interaction with the network nodes, so as to obtain the network status information, and when the status of the network nodes changes, it is possible to notify the network status information acquiring unit 104 timely to update the information. Also, the information of the network nodes can of course be input by the user. For example, the acquired three dimensional distribution space is displayed to the user firstly, then the information of the network nodes is input by the user manually on the display interface of the three dimensional distribution space according to actual or desired positions and performance of the network nodes, and then the network status information is obtained by the network status information acquiring unit 104, so that the system complexity and the implementation cost are reduced.

The display unit 106 may be configured to display the network distribution space information and the network status information which are superimposed.

Figure 2B:
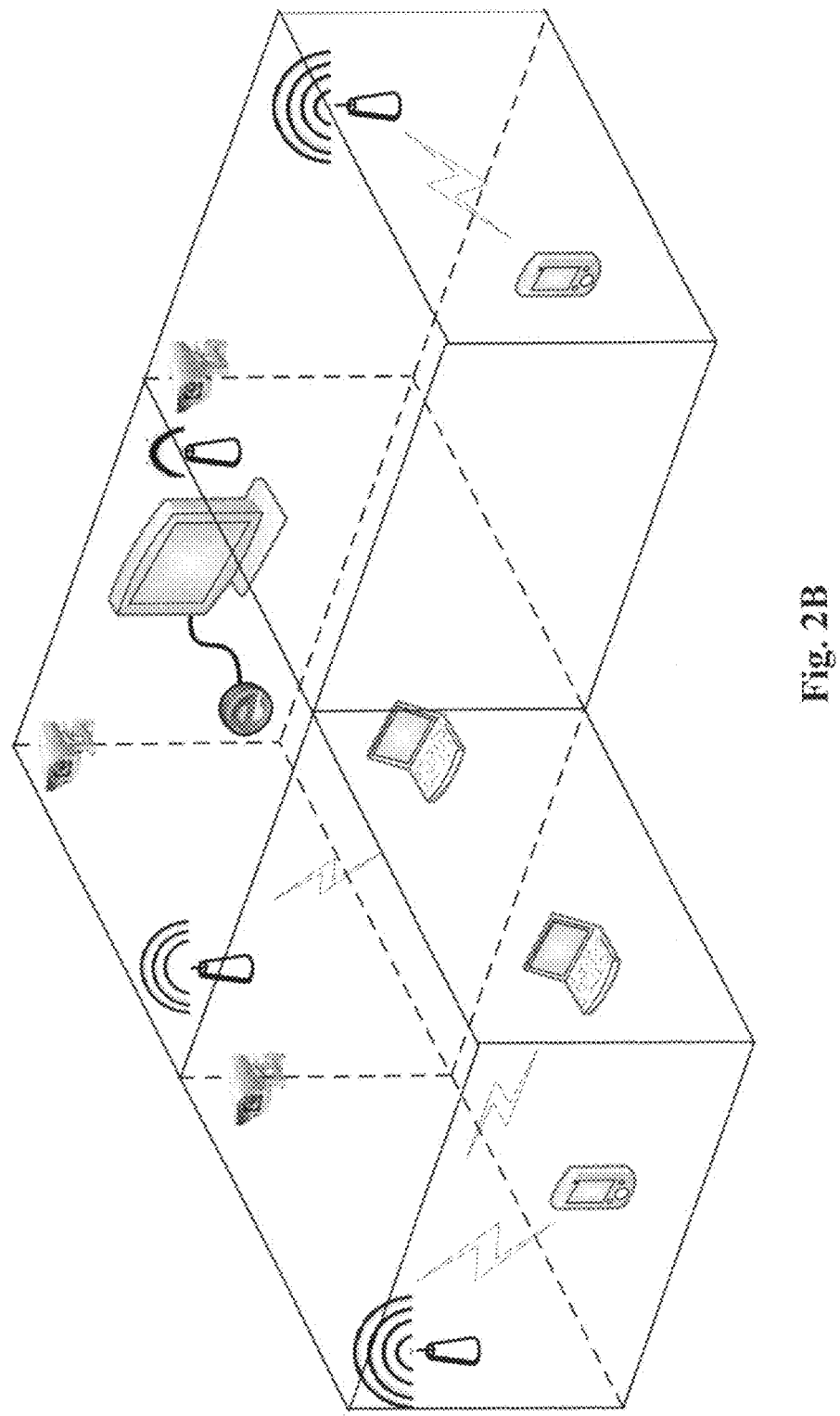
FIG. 2B is a schematic diagram showing a display example after network distribution space information and network status information are superimposed.

The space distribution information of the network nodes is mapped onto the three dimensional distribution space of the network to be monitored, so as to form a complete network distribution map, and corresponding performance information and transmission status information are provided for each network node, so as to obtain the network distribution space information and the network status information which are displayed in a superimposed manner. For example, FIG. 2B shows a schematic diagram of a display example after the network distribution space information and the network status information are superimposed. As shown in FIG. 2B, distribution of respective network nodes, signal status of the network access points, associated link between the network nodes, the signal quality and the like are shown in various schematic icons. These icons are easy to be understood by those skilled in the art, and embody the current network status. Further, the network status can be indicated in other different manners, for example, the signal strength can be indicated by icons with different colors, and the like.

Figure 2C:
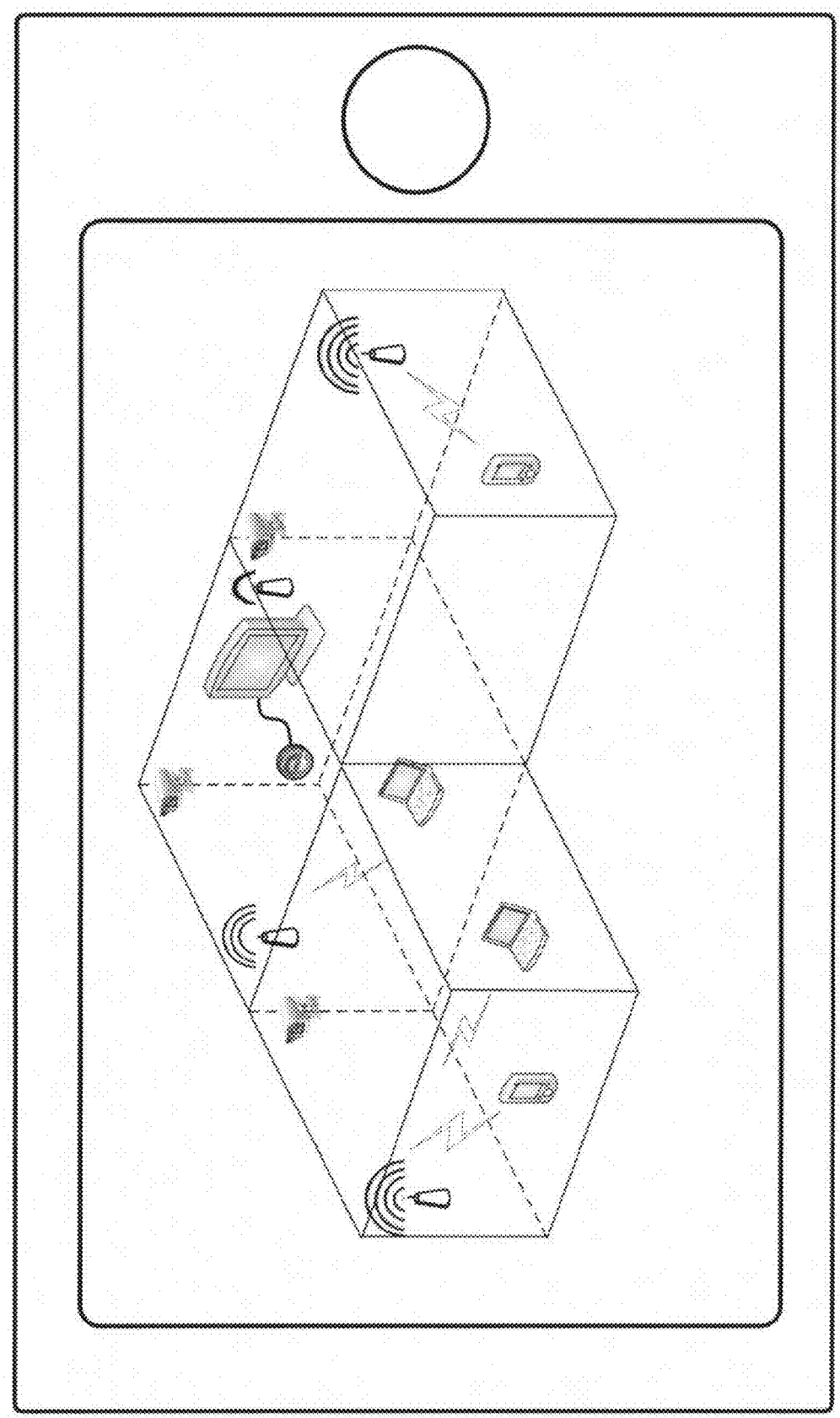
FIG. 2C is a schematic diagram showing the display example shown in FIG. 2B is displayed on an smart phone serving as an example of a network user equipment.

The network distribution space information and the network status information which are displayed in a superimposed manner can be provided in a form of a three dimensional graph to the user via a visualized operation and control interface. For example, FIG. 2C shows the superimposed network distribution space information and network status information displayed on a smart phone serving as an example of network user equipment.

The example of the functional configuration of the wireless network monitoring device 100 according to the embodiment of the disclosure has been described by referring to FIG. 1 above. It can be understood that the network distribution space information and the network status information within the network to be monitored can be presented to the user in a manner of a visualized graph, for facilitating the user to know and control the network to be monitored.

Figure 3:
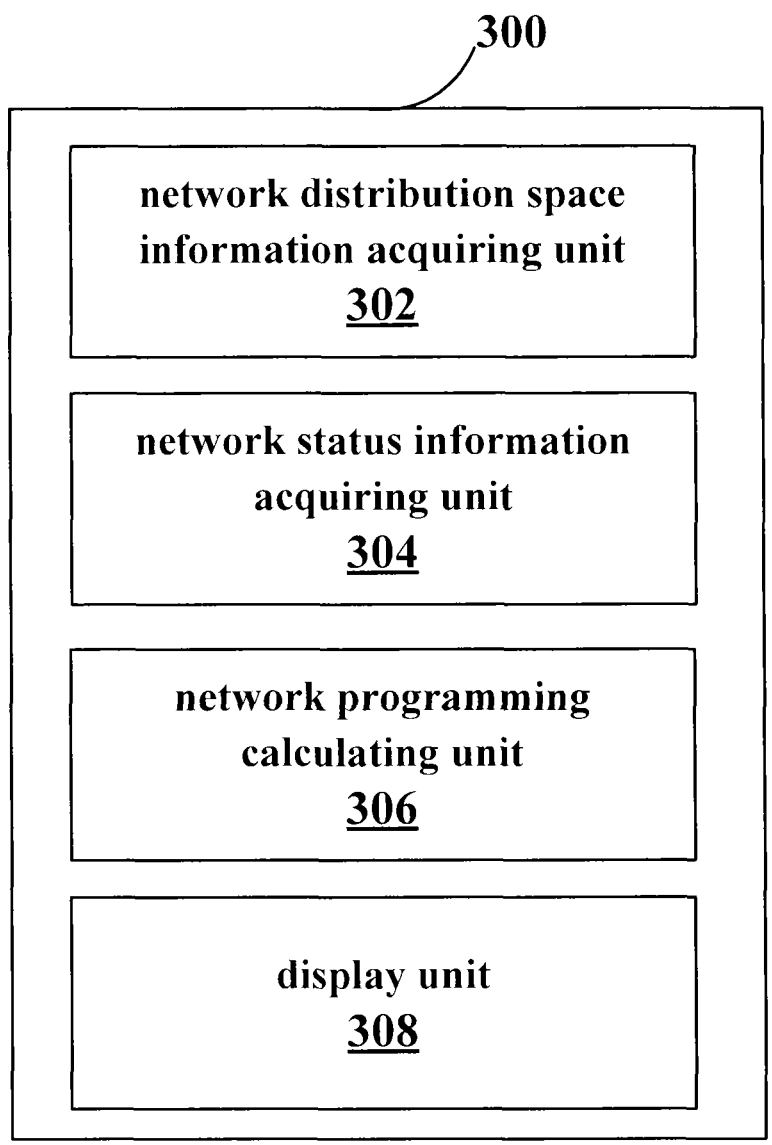
FIG. 3 is a block diagram showing an example of functional configuration of a wireless network monitoring device according to another embodiment of the disclosure.

Next, an example of functional configuration of a wireless network monitoring device according to another embodiment of the disclosure will be described by referring to FIG. 3. FIG. 3 is a block diagram showing an example of functional configuration of a wireless network monitoring device according to another embodiment of the disclosure.

As shown in FIG. 3, a wireless network monitoring device 300 may include a network distribution space information acquiring unit 302, a network status information acquiring unit 304, a network programming calculating unit 306 and a display unit 308. The functional configurations of the network distribution space information acquiring unit 302 and the network status information acquiring unit 304 are the same as those of the network distribution space information acquiring unit 102 and the network status information acquiring unit 104 as shown in FIG. 1 respectively, which will not be described in detail here. Only examples of the functional configurations of the network programming calculating unit 306 and the display unit 308 will be described in detail in the following.

The network programming calculating unit 306 may be configured to calculate, according to at least the network distribution space information acquired by the network distribution space information acquiring unit 302 and the network status information acquired by the network status information acquiring unit 304, optimized network programming within the three dimensional distribution space of the network to be monitored to improve a percentage of coverage of wireless network in the three dimensional distribution space or signal transmission quality of the network nodes. A specific calculating method is given as an example in the following.

Firstly, network access points are assigned to a first kind of network user equipment for which the network access point is not selectable (for example, the user has specified the network access point for the network user equipment in advance). Then, for each access point, remaining capacity is calculated by subtracting the total capacity of the first kind of network user equipment that has been permitted to access from the total capacity of the access point, and then for a second kind of network user equipment for which the network access point is selectable, according to the signal quality from the network user equipment to each network access point and the remaining capacity of each network access point, the network access point is selected for each of the second kind of network user equipment, until a suitable network access point is assigned to each one of the second kind of network user equipment. It should be understood that for a mobile network user equipment, it is preferable that the distribution range of all the network user equipment which is permitted to access a network access point that provides service for the mobile network user equipment is concentrated as much as possible.

Further, for a mobile network access point, according to all the network user equipment that is permitted to access the mobile network access point, the position at which best service quality can be provided for all the network user equipment that is permitted to access is selected from candidate positions. For example, for an omnidirectional antenna, a position which is nearest to the center of all the network user equipment that is permitted to access is selected.

For those network user equipment that is not permitted to access, if the network user equipment is not a key node on the backbone network (a network node the removing of which will make the backbone network lose connectivity), the network user equipment is set to an off status.

It should be understood that the above specific calculating method is only an example but not limitation, and those skilled in the art may calculate the network programming satisfying actual network requirements by using any suitable calculating method depending on actual conditions.

Preferably, the network programming calculating unit 306 may be configured to calculate the optimized network programming according to network status requirement information about the three dimensional distribution space. As an example, the network status requirement information may include at least one of a movement range in the three dimensional distribution space (such as the whole space or a part of the space, for example, several rooms in the house), a movement manner (such as static manner, nomadic manner, moving in a low speed, and moving in a high speed and the like), type of the user equipment desired to be used (such as a mobile phone with a communication module, a tablet computer, a notebook computer, a desktop computer, and various audio/video equipment and the like), desired interconnections among the network nodes (such as the interconnection between the tablet computer and a television set), types and number of the network access points desired to be used and/or cost. The network status requirement information can be input by the user manually, and can be acquired by the wireless network monitoring device 300 by means of the network user equipment. For example, information such as the movement range or the like can be collected by a GPS module in the user equipment.

Preferably, the optimized network programming calculated by the network programming calculating unit 306 may include target working status, target positions and/or target transmission status of respective network nodes.

Specifically, for the network access point, the optimized network programming may include for example selection of working status (on or off), target position, served network user equipment, provided connection, resources and service quality and the like; and for the network user equipment, the optimized network programming may include for example selection of working status (on or off), target position, network access points serving the network user equipment and the like.

According to different system optimization objects, those skilled in the art may adopt different methods to calculate the optimized network programming, as long as the object of improving the percentage of coverage of the wireless network and the signal transmission quality can be achieved, which is not limited in the disclosure.

In addition to the network distribution space information and the network status information which are superimposed described above, the display unit 308 can be configured to display to the user the optimized network programming calculated by the network programming calculating unit 306. For example, the optimized network programming can be presented to the user via a visualized operation and control interface in a visualized manner.

It should be understood that the implementation of the optimized network programming can be a manual operation. For example, if the network node (such as the network access point or the network user equipment) needs to be moved to a new position, an original position and a new target position of the network node can be identified on the visualized operation and control interface, the network node can be moved to the new target position by the user manually, and the position corresponding to the network node can be displayed in real time on the operation and control interface during the moving, so that the user can know clearly whether the current moving is correct. Further, the optimized network programming can be implemented in conjunction with artificial intelligence technology. For example, if the network node needs to be moved to a new position, and the network node is installed with a mechanical device that can move automatically, the network node can move from the original position to the new target position automatically under the monitoring of the wireless network monitoring device according to the disclosure. No limitation on the implementation manner of the optimized network programming is made in the disclosure.

Further, in the case where the network to be monitored and the network user equipment within the network to be monitored are given, the network programming calculating unit 306 may be further configured to program the configuration of the network access points and access strategy.

Specifically, the network programming calculating unit 306 may provide, according to the network distribution space information of the network to be monitored and the network status requirement information, for the user the type of the network access point adapted to be used in the three dimensional distribution space of the network to be monitored, and the user can select an amount of the network access points, a networking price budget, a desired range of disposing position and the like, so that the network access points and the position range thereof can be displayed virtually on the visualized operation and control interface for example.

Then, the network programming calculating unit 306 may select, according to the bandwidth capacity of the network user equipment and the total cost of the network access points, the type and the amount of the network access point required for each space within the network to be monitored, and then calculate the optimized network programming by referring to the desired disposing position range specified by the user. The result of the optimized network programming can be presented to the user in a form of a graph via the visualized operation and control interface. Thus, the user can buy the network access point according to the optimized network programming and perform networking in accordance with the illustrative position.

Figure 4:
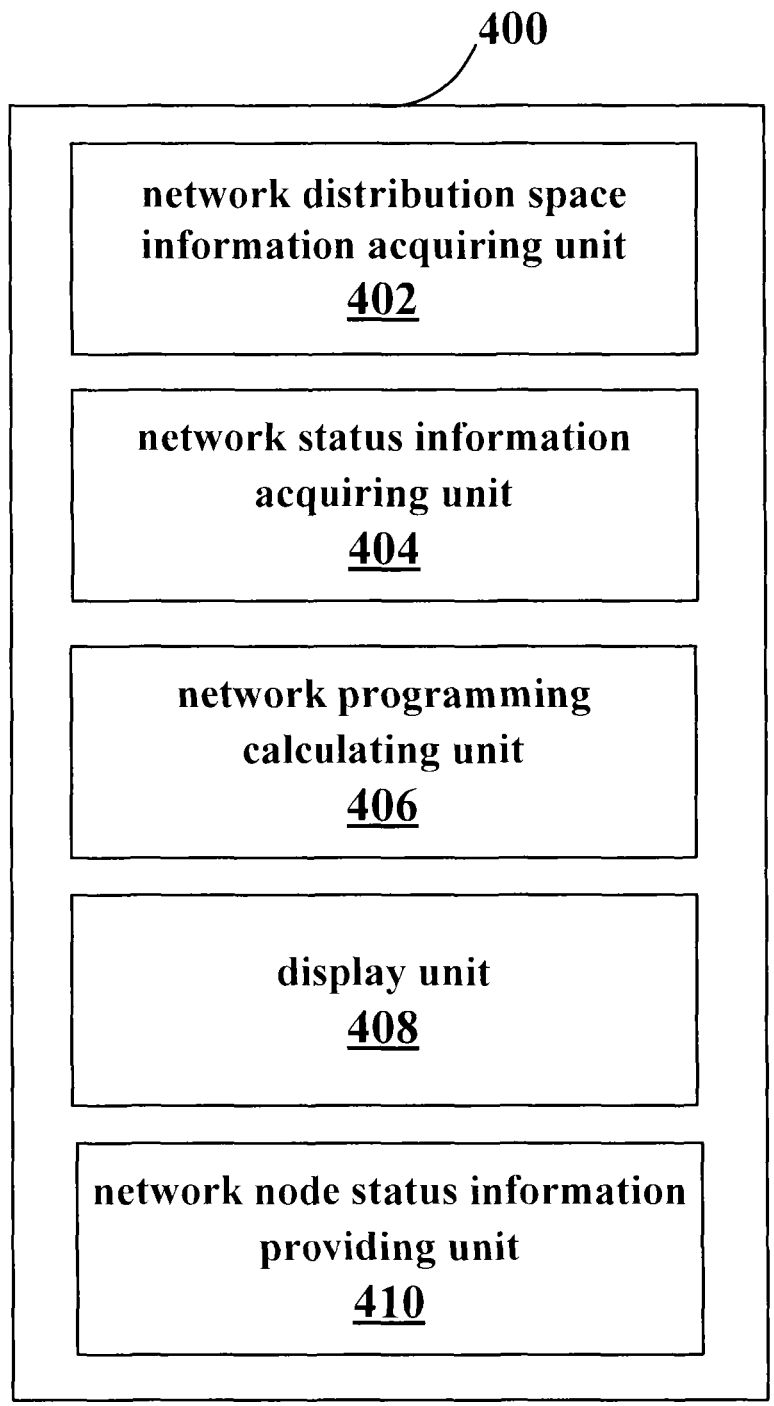
FIG. 4 is a block diagram showing an example of functional configuration of a wireless network monitoring device according to another embodiment of the disclosure.

Next, an example of functional configuration of a wireless network monitoring device according to another embodiment of the disclosure will be described by referring to FIG. 4. FIG. 4 is a block diagram showing an example of functional configuration of a wireless network monitoring device according to another embodiment of the disclosure.

As shown in FIG. 4, a wireless network monitoring device 400 may include a network distribution space information acquiring unit 402, a network status information acquiring unit 404, a network programming calculating unit 406, a display unit 408 and a network node status information providing unit 410. The functional configurations of the network distribution space information acquiring unit 402, the network status information acquiring unit 404, the network programming calculating unit 406 and the display unit 408 are the same as those of the network distribution space information acquiring unit 302, the network status information acquiring unit 304, the network programming calculating unit 306 and the display unit 308 as shown in FIG. 3 respectively, which will not be described in detail here. Only an example of the functional configuration of the network node status information providing unit 410 will be described in detail in the following.

The network node status information providing unit 410 may be configured to make, in response to an operation of selecting a network node by a user, the display unit 408 display network node status information about the selected network node, wherein the network node status information may include position information, performance information, transmission status information of the selected network node and/or optimized network programming information about the network node. That is, the user can conveniently select the network node which he/she desires to know via a visualized operation and control interface for example and obtain the status information about the network node.

Figure 5:
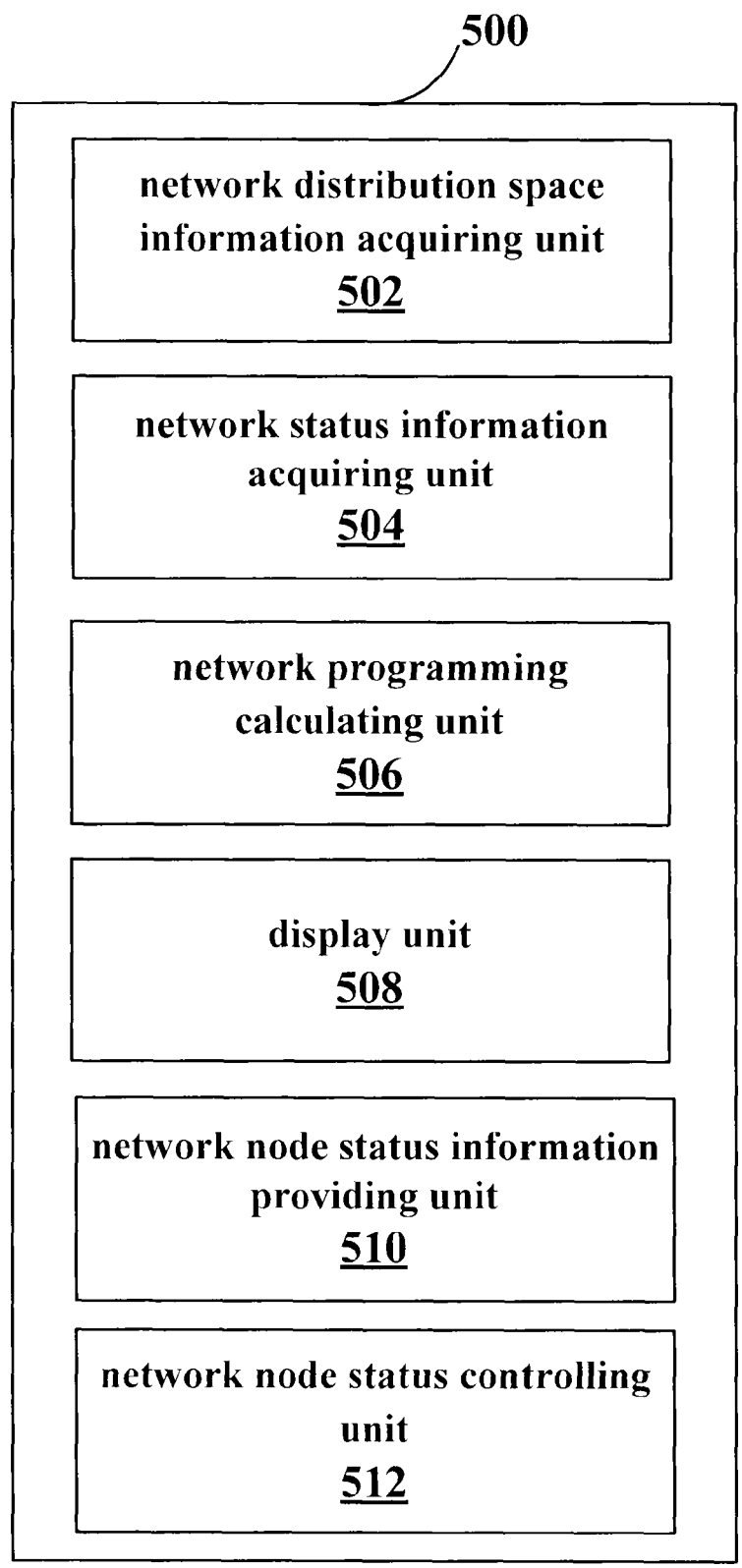
FIG. 5 is a block diagram showing an example of functional configuration of a wireless network monitoring device according to another embodiment of the disclosure.

Next, an example of functional configuration of a wireless network monitoring device according to another embodiment of the disclosure will be described by referring to FIG. 5. FIG. 5 is a block diagram showing an example of functional configuration of a wireless network monitoring device according to another embodiment of the disclosure.

As shown in FIG. 5, a wireless network monitoring device 500 may include a network distribution space information acquiring unit 502, a network status information acquiring unit 504, a network programming calculating unit 506, a display unit 508, a network node status information providing unit 510 and a network node status controlling unit 512. The functional configurations of the network distribution space information acquiring unit 502, the network status information acquiring unit 504, the network programming calculating unit 506, the display unit 508 and the network node status information providing unit 510 are the same as those of the network distribution space information acquiring unit 402, the network status information acquiring unit 404, the network programming calculating unit 406, the display unit 408 and network node status information providing unit 410 as shown in FIG. 4 respectively, which will not be described in detail here. Only an example of the functional configuration of the network node status controlling unit 512 will be described in detail in the following.

The network node status controlling unit 512 may be configured to control position, working status and/or transmission status of the network node according to the optimized network programming information from the network programming calculating unit 506.

Specifically, the status control for the network node may include but not limited to:

a working status changing service: for any network node, the working status can be selected between an operating status and a sleeping status;

a position changing service: for any mobile network node, a best position thereof can be selected so as to obtain best service quality without changing the status of other network nodes;

a link connecting service: for any two network nodes, optimized link and service quality insurance can be selected for data exchange thereof;

a service managing service: for a selected network node, the network node can be logged in remotely via a network, and various services on the node can be checked and controlled completely;

a security verification and processing service: for any network node, the security for the whole network caused by the network node can be estimated and a corresponding reaction can be made; for example, a network node that will cause safety risk is isolated and the whole network connection is repaired and re-established; and an energy consumption managing service: when the network node itself has no service requirement and does not relay for other network nodes, the network node will be automatically turned into an activable semi-sleeping status, so as to save the energy. In the activable semi-sleeping status, the network node still keeps the communication with the network nodes that have wireless link association therewith, but a confirmation signal for maintaining the link communication will be transmitted in a relatively lower frequency as compared with that in a normal connection status; and when it is necessary to use this link, this connection can be recovered by activating.

It should be understood that the status control for the network node can be implemented in a manual manner, an automatic manner or a combination of the two.

Further, when a new service is generated or the status of the exiting service changes, the original network programming may not meet the current requirement, so that the network flow needs to be monitored and calculated.

Figure 6:
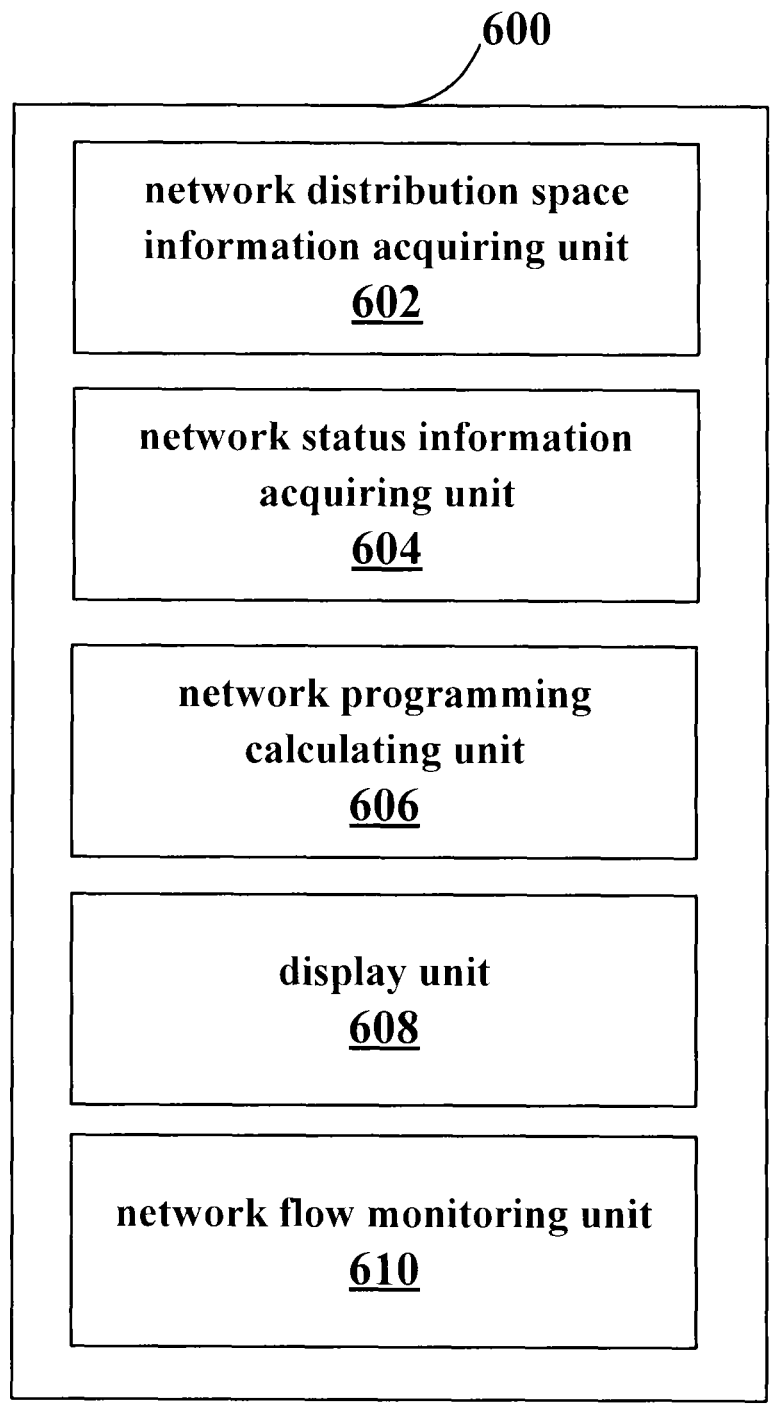
FIG. 6 is a block diagram showing an example of functional configuration of a wireless network monitoring device according to another embodiment of the disclosure.

Next, an example of functional configuration of a wireless network monitoring device according to another embodiment of the disclosure will be described by referring to FIG. 6. FIG. 6 is a block diagram showing an example of functional configuration of a wireless network monitoring device according to another embodiment of the disclosure.

As shown in FIG. 6, a wireless network monitoring device 600 may include a network distribution space information acquiring unit 602, a network status information acquiring unit 604, a network programming calculating unit 606, a display unit 608 and a network flow monitoring unit 610. The functional configurations of the network distribution space information acquiring unit 602, the network status information acquiring unit 604 and the display unit 608 are the same as that of the network distribution space information acquiring unit 302, the network status information acquiring unit 304 and the display unit 308 as shown in FIG. 3 respectively, which will not be described in detail here. Only examples of the functional configurations of the network programming calculating unit 606 and the network flow monitoring unit 610 will be described in detail in the following.

The network flow monitoring unit 610 may be configured to judge, when service changes within the three dimensional distribution space of the network to be monitored, whether network flow in the three dimensional distribution space is able to satisfy service requirement according to the network distribution space information acquired by the network distribution space information acquiring unit 602 and the network status information acquired by the network status information acquiring unit 604, and the network programming calculating unit 606 may be configured to recalculate the optimized network programming according to a judging result of the network flow monitoring unit 610.

Preferably, if the network user equipment is able to get access via a plurality of network access points, the optimized network programming comprises service reformation including content-based link combination and/or splitting, and the network programming calculating unit 606 may further include a service reformation managing module for performing the service reformation.

Figure 7:
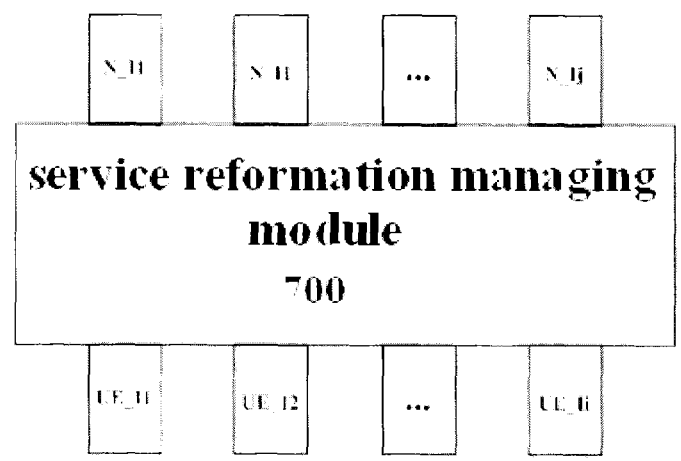
FIG. 7 is a schematic diagram showing an example of a structure of a service reformation managing module according to an embodiment of the disclosure.

For example, FIG. 7 shows an example of a structure of a service reformation managing module 700 according to an embodiment of the disclosure. As shown in FIG. 7, the service reformation managing module 700 is connected to respective network user equipment UE1, . . . , UEi via respective network user equipment-service reformation managing module interfaces UE_I1, . . . , UE_Ii between the service reformation managing module 700 and the network user equipment on one hand, and is connected to respective external networks via respective network-service reformation managing module interfaces N_I1, . . . , N_Ij between the service reformation managing module 700 and the network on the other hand. It should be understood that these interfaces can be a single-hop or multi-hop wired or wireless link.

The specific procedure of the network flow monitoring service performed by the network flow monitoring unit 610 triggered when the service in the network to be monitored changes will be described in detail in the following.

As well known, each link (including the wired link and the wireless link) has a certain network capacity which is determined by the status of the link and the signal/data processing and storage capability of the link-end equipment. The network flow of the link is characterized by a sum of volumes of all the services on the link. Thus, the network flow monitoring unit 610 firstly determines whether the total flow of respective links is still lower than a threshold of the network capacity after an estimated flow of a new service or a flow increment brought by the change in the service is added. If so, the service is permitted to get access, and a state will be entered to wait for an event of generating of the new service or changing of status of the existing service; otherwise the service reformation will be entered.

The service reformation includes content-based link combination and splitting. By combining the links with the same content in the network, localized content sharing is achieved to reduce the network data amount, and thus the resource efficiency is improved. By splitting the content, the content is transmitted via multiple different links and is assembled into integral content at a necessary node, so that load balance can be implemented among the links, and fragment flow in the link can be used sufficiently. If the service reformation can achieve the access of the new service or the status change of the existing service, this service is permitted to get access, and the state will be entered to wait for the event of the generating of the new service or the changing of the status of the existing service; otherwise the network reprogramming will be entered. It should be understood that the procedure of the service reformation can also be considered as a part of the network programming calculation performed by the network programming calculating unit.

Preferably, the service reformation managing module 700 may be configured to perform:

network access function authorization: access rights of respective user equipment to its registered network are assigned to the service reformation managing module 700, so that this module can completely be responsible for the network access service management of respective user equipment, and the network access service management between different network operators and different service providers can be achieved;

service flow task assignment: the content-based link combination and splitting will be achieved;

service flow input: the content of the service flow task is transmitted to the cache of the service reformation managing module 700; for a downloading task, the data is acquired from the network end via the corresponding network-service reformation managing module interface N_I1, . . . , N_Ij and is placed in the cache; and for a uploading task, the data is acquired from the user equipment end via the corresponding network user equipment-service reformation managing module interface UE_I1, . . . , UE_Ii and is placed in the cache; and service flow data integration and output: the content of the service flow task in the cache are integrated and then output to the corresponding network node; for the downloading task, the integrated data is output to the corresponding network user equipment via corresponding network user equipment-service reformation managing module interface UE_I1, . . . , UE_Ii; and for the uploading task, the integrated data is output to the corresponding network end via the corresponding network-service reformation managing module interface NI_I1, . . . , N_Ij.

It can be seen that since the task of "network access function authorization" performed by the service reformation managing module 700 enables this module to achieve the network access service management among different network operators, so that this module becomes a virtual managing unit over various networks.

If the current service requirements still can not be satisfied after the service reformation, the network programming calculating unit 606 may be configured to call the network programming calculating solution to recalculate so as to judge whether there is a network status which can meet the access of the new service or the status change of the existing service. If so, the service is permitted to get access and the network configuration is performed again according to the newly-calculated optimized network programming result; otherwise a promotion that the network is busy is turned to and the state is entered to wait for the event of the generating of the new service or the changing of the status of the existing service.

It should be understood that according to the embodiments of the disclosure, the network status can be adjusted when the service in the network to be monitored changes, so that the change in the service within the network can be better adapted to, and the optimum network programming solution can be provided as much as possible in various cases, and thus the user may obtain better network service experience.

Figure 8:
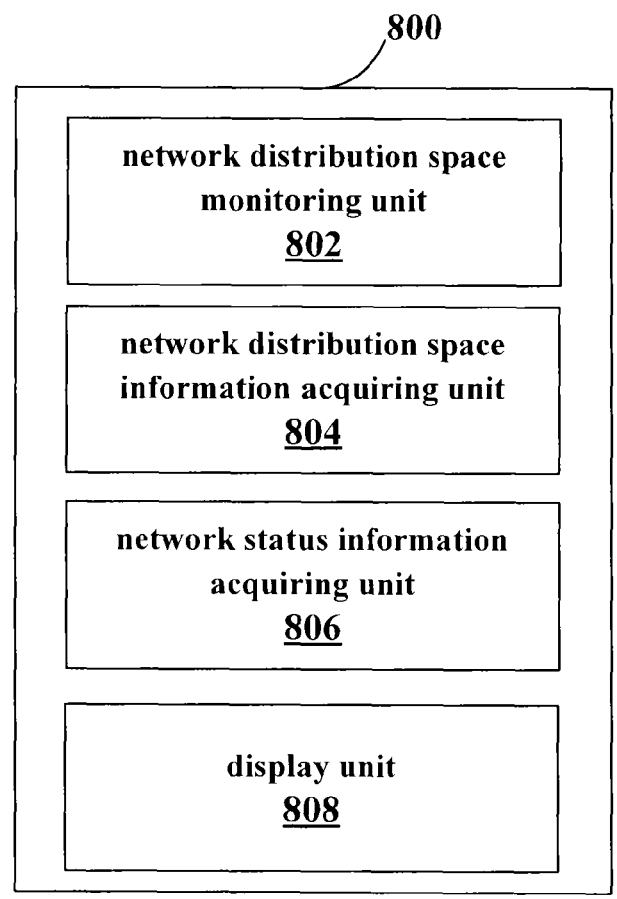
FIG. 8 is a block diagram showing an example of functional configuration of a wireless network monitoring device according to another embodiment of the disclosure.

Next, an example of functional configuration of a wireless network monitoring device according to another embodiment of the disclosure will be described by referring to FIG. 8. FIG. 8 is a block diagram showing an example of functional configuration of a wireless network monitoring device according to another embodiment of the disclosure.

As shown in FIG. 8, a wireless network monitoring device 800 may include a network distribution space monitoring unit 802, a network distribution space information acquiring unit 804, a network status information acquiring unit 806 and a display unit 808. The functional configurations of the network distribution space information acquiring unit 804, the network status information acquiring unit 806 and the display unit 808 are the same as those of the network distribution space information acquiring unit 102, the network status information acquiring unit 104 and the display unit 106 as shown in FIG. 1 respectively, which will not be described in detail here. Only an example of the functional configuration of the network distribution space monitoring unit 802 will be described in detail in the following.

The network distribution space monitoring unit 802 may be configured to collect network distribution space information about the three dimensional distribution space of the network to be monitored so as to supply it to the network distribution space information acquiring unit 804, and the network distribution space monitoring unit 802 may include a camera, a locating detecting device, an image scanning device and/or an information input device.

Preferably, depending on the constructing manner of the network distribution space monitoring unit 802, the network distribution space monitoring unit 802 has different information acquiring manners. Specifically, for example, if the network distribution space monitoring unit 802 is a camera or a set of cameras disposed in the three dimensional distribution space of the network to be monitored, a complete real three dimensional network distribution space map can be obtained by collecting and synthesizing space image information, so that a real network distribution environment can be presented to the user. If the network distribution space monitoring unit 802 is the locating detecting device, the network distribution space can be depicted using detection and feedback of electromagnetic waves or sound waves, and then a virtual synthesized network distribution environment resulting from image synthesis can be presented to the user. If the network distribution space monitoring unit 802 is the image scanning device, a network distribution space image that is photographed or drawn can be scanned and can be automatically converted so as to obtain the data information about this network distribution space, and then the virtual network distribution environment can be presented to the user through further image synthesis. If the network distribution space monitoring unit 802 is the space information input device, the space data information (such as the length, width and height of the room and the like) that is input by the user can be automatically synthesized into a space map, so that the virtual network distribution environment can be presented to the user.

It should be understood that although the network distribution space monitoring unit 802 is described as being included in the wireless network monitoring device 800 in this embodiment, the network distribution space monitoring unit can be present separately from the wireless network monitoring device or be embedded in the wireless network monitoring device according to different construction manners or monitoring accuracy requirements. For example, the network distribution space monitoring unit may be a high-definition monitoring camera, a detecting device or a scanning apparatus independent from the wireless network monitoring device, so as to provide monitoring data with higher accuracy. The network distribution space monitoring unit may also be a common camera or a microphone (sound wave detector) embedded in the wireless network monitoring device, so as to provide portable monitoring data with lower accuracy. The network distribution space monitoring unit may also be a space data input and image synthesis software for providing convenient network distribution space information with much lower accuracy.

Preferably, the wireless network monitoring device according to the above embodiments of the disclosure may further include a user interface unit for receiving an input from the user. For example, the user may input the above network status requirement information and the like via the user interface unit.

Further, it should be noted that the wireless network monitoring device according to the above embodiments of the disclosure may be an independent apparatus, may be a part of the network access point, and may also be embedded in the network user equipment, which is not limited in the disclosure.

It can be seen that according to the embodiments of the disclosure, by displaying the network layout environment of the network to be monitored and the status information of the network access point and the network user equipment on the visualized operation and touch interface, the optimized network programming can be provided and presented to the user according to the current network status, so that the user can be provided with convenient services of data management, apparatus management, safety management and energy-saving management, and thus the user can obtain better network service experience.

It should be noted here that although exemplary functional configurations of the wireless network monitoring device according to the embodiments of the disclosure have been described by referring to FIG. 1 to FIG. 8 above, it should be understood that this is only an example but not limitation, and those skilled in the art may modify the above structure as required, for example, some function units can be added, omitted or combined, and all these variations are considered to fall within the substantive scope of the present technique.

Further, it is to be noted that with the development of distributed processing technique such as cloud computing, it is possible that the main functions of various components of the wireless network monitoring device according to the embodiments of the disclosure are performed by different entities in a distributed manner. For example, the function of acquiring the network status information can be performed by a router, and the smart phone serves mainly as a display unit, for receiving and displaying the network distribution space information and the network status information. In this case, the network distribution space information acquiring unit, the network status information acquiring unit and the like described above can directly or indirectly acquire the corresponding information.

Figure 9:
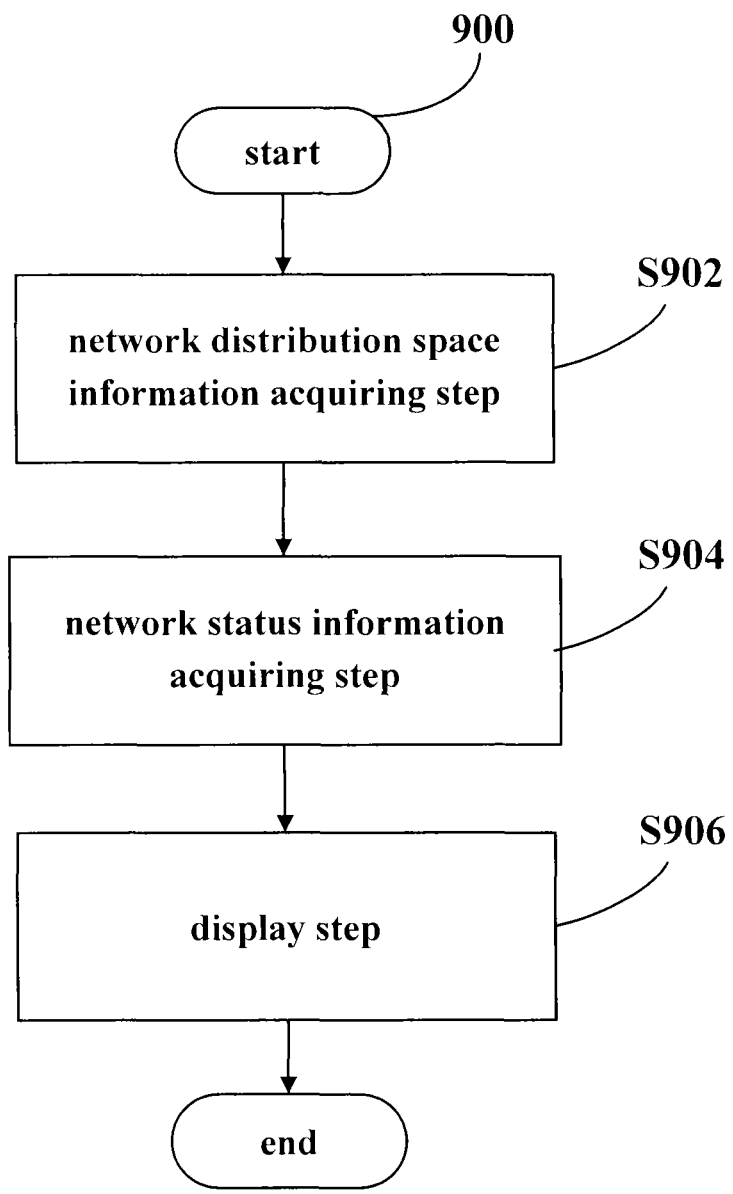
FIG. 9 is a flow chart showing an example of a procedure of a method for use in a wireless communication system according to an embodiment of the disclosure.

Next, an example of a procedure of a method for use in a wireless communication system will be described by referring to FIG. 9. FIG. 9 is a flow chart showing an example of a procedure of a method for use in a wireless communication system according to an embodiment of the disclosure.

As shown in FIG. 9, a method 900 according to the embodiment of the disclosure may include: a network distribution space information acquiring step S902, a network status information acquiring step S904 and a display step S906. The examples of the processes in respective steps will be described in detail in the following.

In the network distribution space information acquiring step S902, network distribution space information of a three dimensional distribution space of a network to be monitored may be acquired.

Next, in the network status information acquiring step S904, position information of network nodes in the three dimensional distribution space of the network to be monitored and performance information of the network nodes may be acquired, thereby obtaining network status information about the three dimensional distribution space.

Then, in the display step S906, the network distribution space information obtained in the network distribution space information acquiring step S902 and the network status information obtained in the network status information acquiring step S904 which are superimposed may be displayed.

Figure 10:
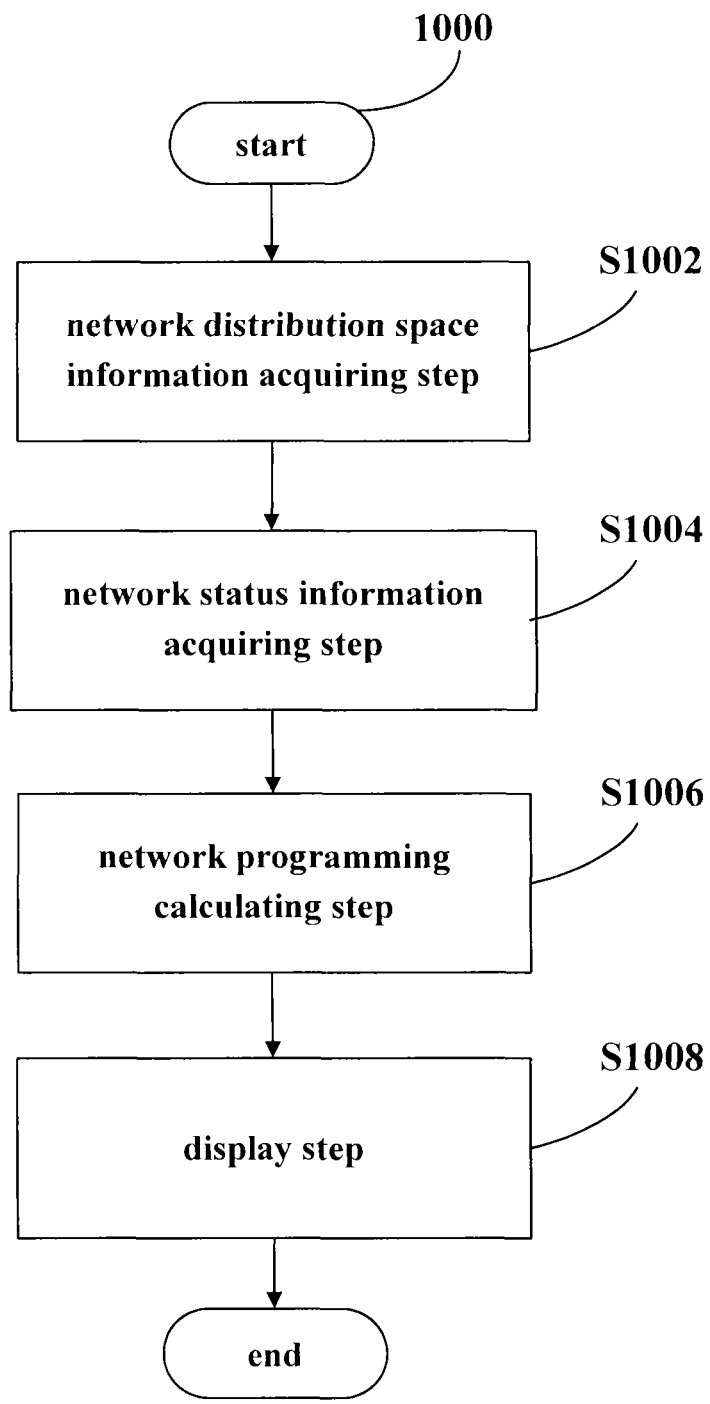
FIG. 10 is a flow chart showing an example of a procedure of a method for use in a wireless communication system according to another embodiment of the disclosure.

Next, an example of a procedure of a method for use in a wireless communication system according to another embodiment of the disclosure will be described by referring to FIG. 10. FIG. 10 is a flow chart showing an example of a procedure of a method for use in a wireless communication system according to another embodiment of the disclosure.

As shown in FIG. 10, a method 1000 according to this embodiment may include: a network distribution space information acquiring step S1002, a network status information acquiring step S1004, a network programming calculating step S1006 and a display step S1008. The processes in the network distribution space information acquiring step S1002 and the network status information acquiring step S1004 are the same as that in the network distribution space information acquiring step S902 and the network status information acquiring step S904 as shown in FIG. 9 respectively, which will not be described in detail here. Only the processes in the network programming calculating step S1006 and the display step S1008 will be described in detail in the following.

In the network programming calculating step S1006, optimized network programming within the three dimensional distribution space of the network to be monitored may be calculated according to at least the network distribution space information and the network status information, to improve a percentage of coverage of wireless network in the three dimensional distribution space or signal transmission quality of the network nodes.

Next, in the display step S1008, in addition to the network distribution space information and the network status information which are superimposed, the result of the optimized network programming may also be displayed.

Figure 11:
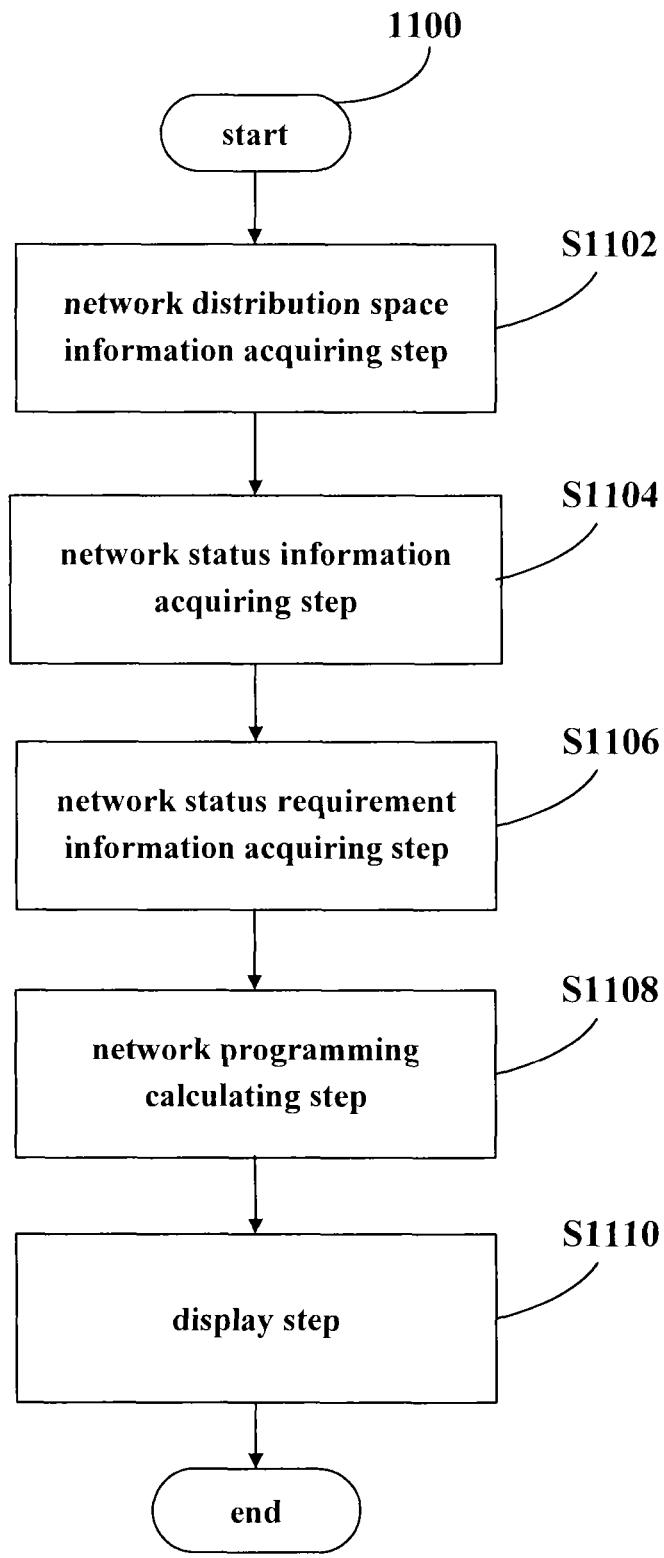
FIG. 11 is a flow chart showing an example of a procedure of a method for use in a wireless communication system according to another embodiment of the disclosure.

Next, an example of a procedure of a method for use in a wireless communication system according to another embodiment of the disclosure will be described by referring to FIG. 11. FIG. 11 is a flow chart showing an example of a procedure of a method for use in a wireless communication system according to another embodiment of the disclosure.

As shown in FIG. 11, a method 1100 according to this embodiment may include: a network distribution space information acquiring step S1102, a network status information acquiring step S1104, a network status requirement information acquiring step S1106, a network programming calculating step S1108 and a display step S1110. The processes in the network distribution space information acquiring step S1102, the network status information acquiring step S1104 and the display step S1110 are the same as that in the network distribution space information acquiring step S1002, the network status information acquiring step S1004 and the display step S1008 as shown in FIG. 10 respectively, which will not be described in detail here. Only the processes in the network status requirement information acquiring step S1106 and the network programming calculating step S1108 will be described in detail in the following.

In the network status requirement information acquiring step S1106, network status requirement information about the three dimensional distribution space of the network to be monitored may be acquired.

Then, in the network programming calculating step S1108, in addition to the network space distribution information and the network status information, the optimized network programming may be calculated further according to the acquired network status requirement information.

Figure 12:
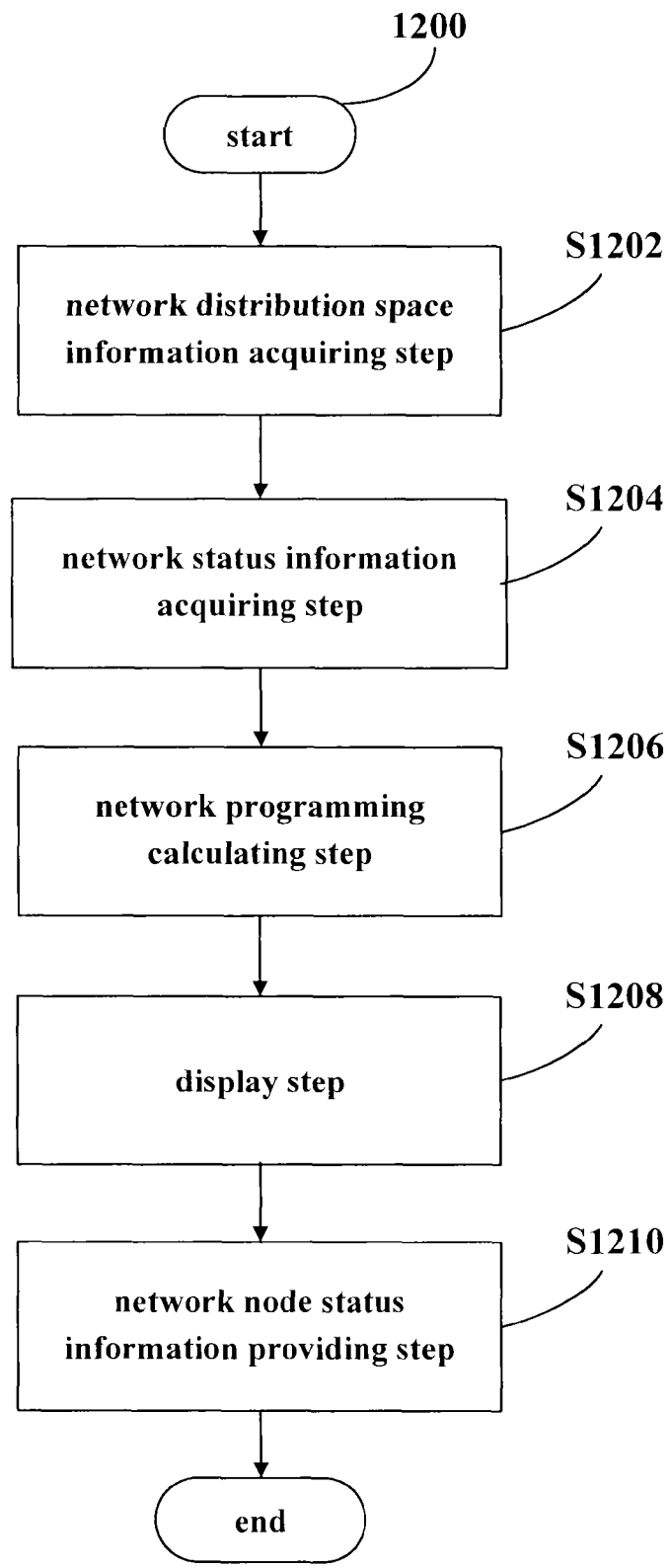
FIG. 12 is a flow chart showing an example of a procedure of a method for use in a wireless communication system according to another embodiment of the disclosure.

FIG. 12 is a flow chart showing an example of a procedure of a method for use in a wireless communication system according to another embodiment of the disclosure.

As shown in FIG. 12, a method 1200 according to this embodiment may include: a network distribution space information acquiring step S1202, a network status information acquiring step S1204, a network programming calculating step S1206, a display step S1208 and a network node status information providing step S1210. The processes in the network distribution space information acquiring step S1202, the network status information acquiring step S1204, the network programming calculating step S1206 and the display step S1208 are the same as that in the network distribution space information acquiring step S1002, the network status information acquiring step S1004, the network programming calculating step S1006 and the display step S1008 as shown in FIG. 10 respectively, which will not be described in detail here. Only the process in the network node status information providing step S1210 will be described in detail in the following.

In the network node status information providing step S1210, in response to an operation of selecting a network node by a user, network node status information about the selected network node may be displayed, the network node status information including position information, performance information, transmission status information of the selected network node and/or optimized network programming information about the network node.

Figure 13:
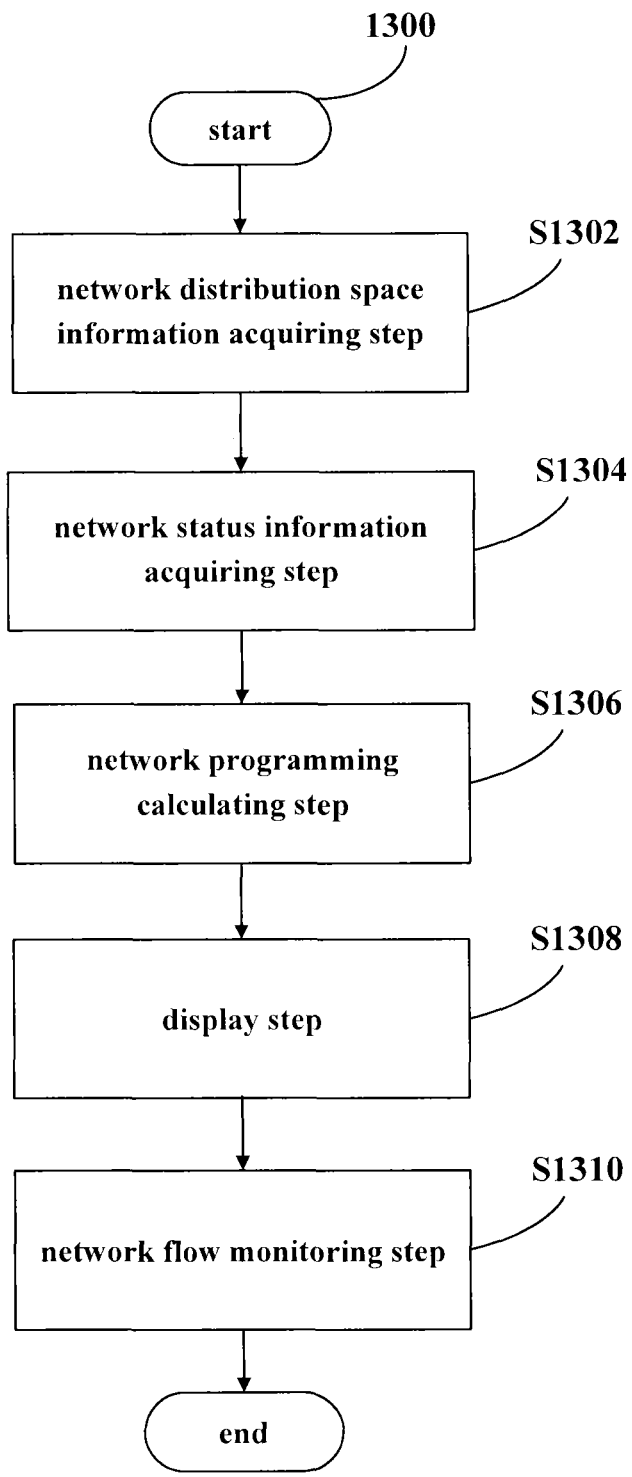
FIG. 13 is a flow chart showing an example of a procedure of a method for use in a wireless communication system according to another embodiment of the disclosure.

Next, an example of a procedure of a method for use in a wireless communication system according to another embodiment of the disclosure will be described by referring to FIG. 13. FIG. 13 is a flow chart showing an example of a procedure of a method for use in a wireless communication system according to another embodiment of the disclosure.

As shown in FIG. 13, a method 1300 according to this embodiment may include: a network distribution space information acquiring step S1302, a network status information acquiring step S1304, a network programming calculating step S1306, a display step S1308 and a network flow monitoring step S1310. The processes in the network distribution space information acquiring step S1302, the network status information acquiring step S1304, the network programming calculating step S1306 and the display step S1308 are the same as that in the network distribution space information acquiring step S1002, the network status information acquiring step S1004, the network programming calculating step S1006 and the display step S1008 as shown in FIG. 10 respectively, which will not be described in detail here. Only the process in the network flow monitoring step S1310 will be described in detail in the following.

In the network flow monitoring step S1310, when service changes within the three dimensional distribution space of the network to be monitored, it can be judged whether network flow in the three dimensional distribution space is able to satisfy service requirement according to the network distribution space information and the network status information.

Preferably, in the network programming calculating step S1306, the optimized network programming may be recalculated further according to a judging result in the network flow monitoring step S1310.

Although examples of the flows of the method for use in the wireless communication system according to the embodiments of the disclosure have been described in conjunction with FIG. 9 to FIG. 13 above, it should be understood by those skilled in the art that the flow charts shown in the drawing are only illustrative, and corresponding modifications can be made to the above method flow according to different practical applications and specific requirements.

It is to be noted that the method for use in the wireless communication system according to the embodiments of the disclosure corresponds to the previously described device embodiment, and thus for the part that is not described in detail in the method embodiment, reference can be made to the corresponding description in the device embodiment, which will not be described in detail here.

Figure 14:
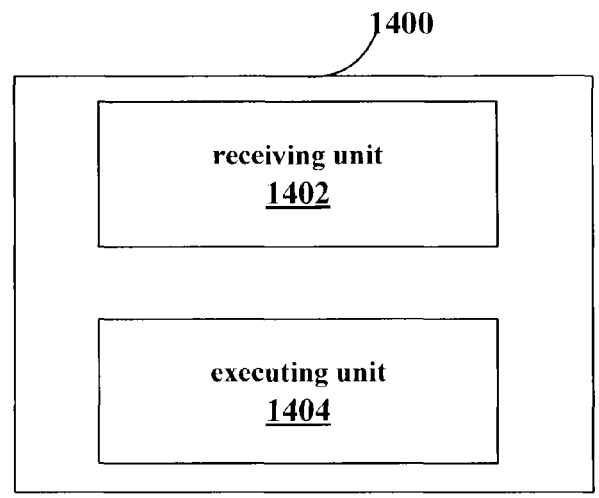
FIG. 14 is a block diagram showing an example of functional configuration of a device in a wireless communication system according to an embodiment of the disclosure.

Next, an example of functional configuration of a device in a wireless communication system according to an embodiment of the disclosure will be described by referring to FIG. 14. FIG. 14 is a block diagram showing an example of functional configuration of a device in a wireless communication system according to an embodiment of the disclosure.

As shown in FIG. 14, a device 1400 according to this embodiment may include a receiving unit 1402 and an executing unit 1404.

Specifically, the receiving unit 1402 may be configured to receive status control for the device 1400 from the wireless network monitoring device according to the above embodiments.

The executing unit 1404 may be configured to change a position, working status and/or transmission status of the device 1400 according to the status control received by the receiving unit 1402.

It should be understood that the device 1400 according to this embodiment may be for example a network node such as a network access point or network user equipment, which can perform information interaction with the wireless network monitoring device and change the status itself according to the control of the wireless network monitoring device, so that the device 1400 which is a network access point for example can provide better service quality for the network user equipment, or the device 1400 which is network user equipment can obtain better service quality from the network access point, and the energy-saving management can also be achieved.

Further, an embodiment of the disclosure further provides a storage medium including machine-readable program codes which when executed on a information processing apparatus cause the information processing apparatus to perform the method for use in the wireless communication system in the embodiments of the disclosure as described above.

Further, an embodiment of the disclosure further provides a program product including machine-executable instructions which when executed on a information processing apparatus cause the information processing apparatus to perform the method for use in the wireless communication system in the embodiments of the disclosure as described above.

Accordingly, the storage medium for carrying the program product in which the machine-readable instruction codes are stored is also included in the disclosure of the invention. The storage medium includes but not limited to a soft disk, an optical disk, a magneto-optical disk, a storage card, a storage stick and the like.

Figure 15:
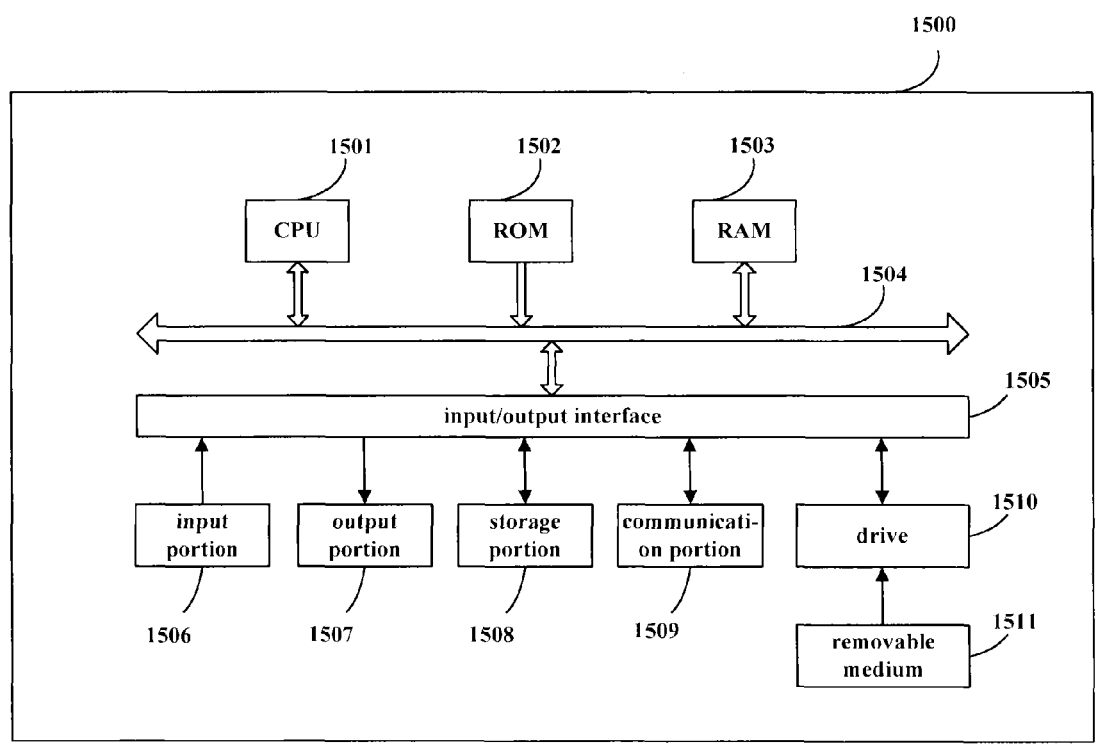
FIG. 15 is a block diagram showing an example structure of a personal computer serving as an information processing apparatus that can be adopted in an embodiment of the disclosure.

Further, it should be noted that the above series of processes and devices may also be implemented by software and/or firmware. In the case where the above series of processes and devices are implemented by software and/or firmware, a program constituting the software is installed onto a computer with a dedicated hardware structure such as a general purpose personal computer 1500 as shown in FIG. 15 from the storage medium or network. The computer, when being installed with various programs, can perform various functions and the like In FIG. 15, a Central Processing Unit (CPU) 1501 performs various processes according to the program stored in a Read-Only Memory (ROM) 1502 or the program loaded into a Random Access Memory (RAM) 1503 from a storage portion 1508. In the RAM 1503, the data required when the CPU 1501 performs various processes and the like is also stored as required.

The CPU 1501, the ROM 1502 and the RAM 1503 are connected to each other via a bus 1504. An input/output interface 1505 is also connected to the bus 1504.

The following components are connected to the input/output interface 1505: an input portion 1506, including a keyboard, a mouse and the like; an output portion 1507, including a display, such as a Cathode Ray Tube (CRT), a Liquid Crystal Display (LCD) and the like, a speaker and the like; the storage portion 1508, including a hard disk and the like; and a communication portion 1509, including a network interface card such as a LAN card, a modem and the like. The communication portion 1509 performs the communication process via a network such as the Internet.

A drive 1510 may also be connected to the input/output interface 1505 as required. A removable medium 1511 such as a magnetic disk, an optical disk, a magneto-optical disk, a semiconductor memory or the like is mounted onto the drive 1510 as required, so that the computer program read out from the removable medium 1511 is installed into the storage portion 1508 as required.

In the case where the above series of processes are implemented using software, the program constituting the software is installed from a network such as the Internet or a storage medium such as the removable medium 1511.

It should be understood by those skilled in the art that the storage medium is not limited to the removable medium 1511 in which the program is stored and which is distributed separately from the device for providing the user with the program as shown in FIG. 15. The example of the removable medium 1511 includes a magnetic disk (including a soft disk (registered trademark)), an optical disk (including a Compact Disk Read-Only Memory (CD-ROM) and a Digital Versatile Disk (DVD)), a magnetic-optical disk (including a Mini Disk (MD) (registered trademark)) and a semiconductor memory. Alternatively, the storage medium may be the ROM 1502, the hard disk contained in the storage portion 1508 and the like, in which the program is stored and which is distributed to the user together with the device in which the storage medium is contained.

It is further to be noted that the steps of performing the above series of processes may be naturally performed chronologically in an order of description but not necessarily. Some steps may be performed in parallel or independently from one another.

Application Example

Presently, an intelligent wireless communication apparatus provides significant convenience for the implementation of the wireless network monitoring device in view of the data processing ability and the function. For example, the combination of the Google™ glass and the smart phone provides a solution for the implementation of the wireless network monitoring device: in which the Google™ glass provides the visualized operation and control interface between the device and the user and the network distribution space monitoring function, for collecting the information of the network distribution space, providing various information interaction between the wireless network monitoring device and the user, and directing the user to implement the network programming result; and the smart phone provides other corresponding calculation and storage functions.

The invention claimed is:

1. A wireless network monitoring device in a wireless communication system, comprising:
   circuitry configured to
   acquire network distribution space information of a three dimensional distribution space of a network to be monitored;
   acquire position information of network nodes in the three dimensional distribution space and performance information of the network nodes, to obtain network status information about the three dimensional distribution space; and
   calculate, according to at least the network distribution space information and the network status information, optimized network programming within the three dimensional distribution space to improve a percentage of coverage of the wireless network in the three dimensional distribution space or signal transmission quality of the network nodes,
   wherein the optimized network programming comprises target working status, target positions, target transmission status, service managing service, and security verification and processing service of respective network nodes, the service managing service includes remotely logging into a selected network node via the network and controlling and checking selected services, and the security verification and processing service includes estimating a whole network security based on the selected network node and calculating a corresponding response.

2. The wireless network monitoring device according to claim 1, wherein the network nodes comprise network access points.

3. The wireless network monitoring device according to claim 2, wherein the network nodes further comprise network user equipment, and wherein the circuitry is further configured to acquire transmission status information of the network nodes so as to obtain the network status information.

4. The wireless network monitoring device according to claim 1,
   wherein the circuitry is further configured to display the optimized network programming.

5. The wireless network monitoring device according to claim 1, wherein the circuitry is further configured to calculate the optimized network programming according to network status requirement information about the three dimensional distribution space.

6. The wireless network monitoring device according to claim 5, wherein the network status requirement information comprises a movement range in the three dimensional distribution space, a movement manner, types of user equipment desired to be used, desired interconnections among the network nodes, types and number of network access points desired to be used and/or cost.

7. The wireless network monitoring device according to claim 1, wherein the circuitry is further configured to display, in response to an operation of selecting a network node by a user, network node status information about the selected network node by the user, the network node status information comprising position information, performance information, transmission status information of the selected network node and/or optimized network programming information about the network node.

8. The wireless network monitoring device according to claim 7, wherein the circuitry is further configured to control position, working status and/or transmission status of the selected network node by the user according to the optimized network programming information.

9. The wireless network monitoring device according to claim 4, wherein the circuitry is further configured to determine, when service changes within the three dimensional distribution space, whether network flow in the three dimensional distribution space is able to satisfy service requirement according to the network distribution space information and the network status information; and
   recalculate the optimized network programming according to the determined network flow.

10. The wireless network monitoring device according to claim 9, wherein the optimized network programming information further includes service reformation, the service reformation further includes a combination of a content-based link attribute based on combining the network links with content in the network and a splitting attribute based on information related to splitting the content into one or more links.

11. The wireless network monitoring device according to claims 1, wherein the circuitry is further configured to collect network distribution space information about the three dimensional distribution space of the network to be monitored,
    wherein the circuitry comprises a camera, a locating detecting device, an image scanning device and/or an information input device.

12. The wireless network monitoring device according to claim 5, wherein the circuitry is further configured to receive an input from a user,
    wherein the network status requirement information is either input by the user or acquired automatically by the wireless network monitoring device.

13. A method for use in a wireless communication system, comprising:
    acquiring, with circuitry, network distribution space information of a three dimensional distribution space of a network to be monitored;
    acquiring, with circuitry, position information of network nodes in the three dimensional distribution space and performance information of the network nodes;
    obtaining, with circuitry, network status information about the three dimensional distribution space; and
    calculating, with the circuitry, according to at least the network distribution space information and the network status information, optimized network programming within the three dimensional distribution space to improve a percentage of coverage of the wireless network in the three dimensional distribution space or signal transmission quality of the network nodes,
    the optimized network programming comprising target working status, target positions, target transmission status, service managingservice, and security verification and processing service of respective network nodes the service managing service includes remotely logging into a selected network node via the network and controlling and checking selected services, and the security verification and processing service includes estimating a whole network security based on the selected network node and calculating a corresponding response.

14. The method according to claim 13, further comprising:
displaying the network distribution space information, the network status information and the optimized network programming in a superimposed manner.

15. The method according to claim 13, further comprising:
acquiring network status requirement information about the three dimensional distribution space,
wherein the optimized network programming is calculated further according to the network status requirement information.

16. The method according to claim 13, further comprising:
displaying, in response to an operation of selecting a network node by a user, network node status information about the selected network node by the user, the network node status information comprising position information, performance information, transmission status information of the selected network node by the user and/or optimized network programming information about the selected network node by the user.

17. The method according to claim 13, further comprising:
determining, when service changes within the three dimensional distribution space, whether network flow in the three dimensional distribution space is able to satisfy service requirement according to the network distribution space information and the network status information,
wherein the optimized network programming is recalculated further according to the determined network flow.

18. A device in a wireless communication system, comprising:
circuitry configured to
receive status control for the device from the wireless network monitoring device according to claim 1; and
change a position, working status and/or transmission status of the device according to the received status control.

19. The wireless network monitoring device according to claim 1, wherein the circuitry is further configured to display the network distribution space information and the network status information in a superimposed manner.

20. The wireless network monitoring device according to claim 1, wherein the transmission status includes status of an associated backbone network link between network access points and network user equipment.

* * * * *